United States Patent Office 3,287,471
Patented Nov. 22, 1966

3,287,471
PYRROLIDINYL N-PHENYL-N-
BENZYLCARBAMATES
John W. Cusic, Skokie, and Henry W. Sause, Deerfield,
Ill., assignors to G. D. Searle & Co., Chicago, Ill., a
corporation of Delaware
No Drawing. Filed May 5, 1964, Ser. No. 365,196
6 Claims. (Cl. 260—326.3)

The present invention relates to a group of pyrrolidinyl esters of N-benzyl-N-phenylcarbamic acid. More particularly, the present invention relates to a group of carbamates having the following general formula

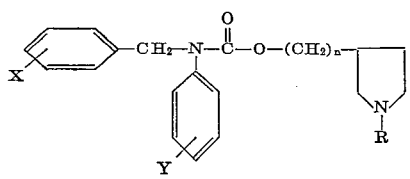

wherein X is selected from the group consisting of hydrogen, methyl, and halogen; Y is selected from the group consisting of hydrogen, methyl, and halogen; $n$ is a whole number between 0 and 1 inclusive; and R is lower alkyl. The halogens referred to above include fluorine, chlorine, bromine and iodine. The lower alkyl radicals referred to above contain up to 6 carbon atoms and can be exemplified by radicals such as methyl, ethyl, propyl, and butyl.

Also encompassed by the present invention are salts of the above compounds. Thus, the compounds indicated above form non-toxic salts with a variety of inorganic and strong organic acids. That is, they form salts with sulfuric, phosphoric, hydrochloric, hydrobromic, sulfamic, citric, lactic, maleic, malic, succinic, tartaric, cinnamic, acetic, benzoic, gluconic, and related acids. They also form quaternary ammonium salts with a variety of organic esters of sulfuric, hydrohalic, and aromatic sulfonic acids. Among such esters are methyl chloride, methyl bromide, ethyl chloride, propyl bromide, butyl chloride, isobutyl bromide, ethyl chloro-acetate, β-bromoethyl acetate, methyl β-bromopropionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propyl toluenesulfonate, propyl chlorohydrin, γ-hydroxypropyl bromide, allyl chloride, methallyl chloride, crotyl bromide, and the like.

The compounds of this invention possess valuable pharmacological properties. In particular, they possess activity as atropinoid and ganglion blocking agents. In addition, they possess anti-biotic activity against a variety of organisms. Thus, they inhibit the growth of the bacteria *Diplococcus pneumoniae*, the protozoa *Tetrahymena gelleii*, and the alga *Chlorella vulgaris*, and they inhibit germination of seeds of Trifolium. A particularly preferred embodiment of the present invention are quaternary salts of those compounds wherein R is methyl and where the quaternizing agent is methyl bromide or methyl iodide.

The compounds of the present invention are conveniently prepared by the reaction of an N-benzylcarbanilyl chloride with the appropriate N-substituted pyrrolidinol or pyrrolidinemethanol in an inert solvent. The intermediate N-benzylcarbanilyl chloride can be conveniently obtained from the reaction of N-benzylaniline with phosgene in an inert solvent.

Alternately, the compounds of this invention can be prepared by reacting two or more equivalents of an N-benzylaniline with a haloformate of the formula

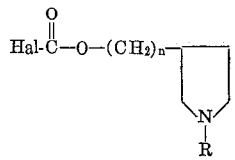

wherein Hal is a halogen atom of atomic number greater than 9 and includes chlorine, bromine, and iodine, and $n$ and R are defined as above.

The following examples are presented to further illustrate the present invention; they should not be construed as limiting it in spirit or in scope. In these examples, quantities are indicated in parts by weight and temperatures in degrees centigrade (° C.).

Example 1

A mixture of 5.05 parts of 1-methyl-3-pyrrolidinol, 11.7 parts of N-benzylcarbanilyl chloride, and 5.05 parts of triethylamine in 190 parts of dry toluene is allowed to stand for 16 hours. A crystalline precipitate appears but the mixture is then heated and stirred at 85° C. for 24 hours. The resultant mixture is then cooled and washed with water until the washings are neutral and the toluene solution is then extracted with 1 N hydrochloric acid. This aqueous acid extract is made alkaline and extracted with ether. The ether solution is washed with water, dried over sodium sulfate, and treated with charcoal, and the solvent is evaporated to leave a tan oil which is 1-methyl-3-pyrrolidinyl N-benzylcarbanilate. This compound has the following formula

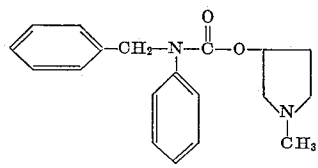

Example 2

A solution is prepared from 5.0 parts of 1-methyl-3-pyrrolidinyl N-benzylcarbanilate and 120 parts of butanone and 4.6 parts of methyl bromide is added. The resultant mixture is kept cold in a pressure bottle for 2 hours and then allowed to stand at room temperature for 3 days. The resultant solution is treated with charcoal and filtered and the solvent is evaporated from the filtrate. The addition of ether to the residue causes a precipitate to form. This material is separated and dried to give 1-methyl-3-pyrrolidinyl N-benzylcarbanilate methobromide melting at about 110–120° C. with decomposition. This compound has the following formula

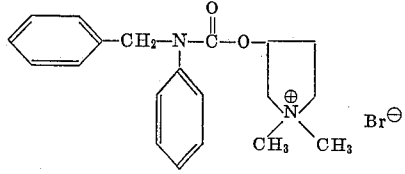

Example 3

An equivalent quantity of N-benzyl-4-chlorocarbanilyl chloride is substituted for the N-benzylcarbanilyl chloride and the procedure of Example 1 is repeated. The product obtained is 1-methyl-3-pyrrolidinyl N-benzyl-4-chlorocarbanilate. Treatment of this compound with methyl bromide according to the procedure described in Example 2 gives 1-methyl-3-pyrrolidinyl N-benzyl-4-chlorocarbanilate methobromide.

In a similar manner, if an equivalent quantity of N-(4-chlorobenzyl)carbanilyl chloride is substituted for the N-benzyl carbanilyl chloride and the procedure of Example 1 is repeated, the product is 1-methyl-3-pyrrolidinyl N-(4-chlorobenzyl)carbanilate. The methobromide of this compound is obtained by the procedure described in Example 2.

Likewise, N-(2-fluorobenzyl)-2-fluorocarbanilyl chloride reacts with 1-methyl-3-pyrrolidinol to give 1-methyl-3-pyrrolidinyl N-(2-fluorobenzyl)-2-fluorocarbanilate and its methobromide.

Example 4

A mixture of 10 parts of 1-isopropyl-3-pyrrolidinol, 19 parts of N-benzylcarbanilyl chloride, and 7.8 parts of triethylamine in 90 parts of toluene is allowed to stand at room temperature for 6 days. It is then heated for 6 hours at 100° C. The product is then isolated from the reaction mixture according to the procedure described in Example 1 to give 1-isopropyl-3-pyrrolidinyl N-benzylcarbanilate as a red-brown oil. This compound has the following formula

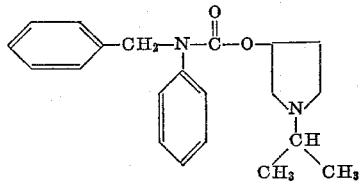

Example 5

A mixture of 5.7 parts of 1-methyl-3-pyrrolidinemethanol, 12.7 parts of N-benzylcarbanilyl chloride and 5.05 parts of triethylamine in 90 parts of dry toluene is allowed to stand at room temperature for 6 days. The resultant mixture is then extracted with hydrochloric acid and the acid extract is made alkaline and extracted with ether. The resultant ether solution is washed with water, dried over sodium sulfate, treated with charcoal, and filtered, and the solvent is evaporated from the filtrate to leave a residual tan oil. This material is 1-methyl-3-pyrrolidinylmethyl N-benzylcarbanilate and it has the following formula

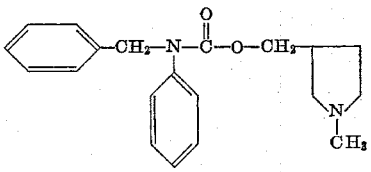

Example 6

An equivalent quantity of N-(4-methylbenzyl)-2-iodocarbanilyl chloride is substituted for the N-benzylcarbanilyl chloride and the procedure of Example 5 is repeated. The product obtained in this way is 1-methyl-3-pyrrolidinylmethyl N-(4-methylbenzyl)-2-iodocarbanilate.

In the same manner, if N-(4-iodobenzyl)-4-methylcarbanilyl chloride is substituted for the N-benzylcarbanilyl chloride and the procedure of Example 5 is repeated, the product obtained is 1-methyl-3-pyrrolidinylmethyl N-(4-iodobenzyl)-4-methylcarbanilate.

Example 7

A mixture of 23 parts of N-benzylcarbanilyl chloride, 14.3 parts of 1-isopropyl-3-pyrrolidinemethanol, and 10.1 parts of triethylamine in 130 parts of dry toluene is refluxed for 16 hours. The resultant mixture is then cooled and extracted with 1 N hydrochloric acid. The aqueous extract is made alkaline and extracted with ether. The resultant ether solution is washed with water and dried over sodium sulfate and the solvent is evaporated. The resultant residue is redissolved in ether and the ether solution is treated with charcoal and filtered and the solvent is evaporated from the filtrate. The resultant residue is a tan colored gummy material. It is 1-isopropyl-3-pyrrolidinylmethyl N-benzylcarbanilate.

Example 8

A solution of 5.0 parts of 1-isopropyl-3-pyrrolidinylmethyl N-benzylcarbanilate in 120 parts of dry butanone is mixed with 4.0 parts of methyl bromide and the resultant mixture is kept in a pressure bottle which is held at ice-bath temperature for 2 hours. The mixture is then allowed to stand at room temperature for 3 days. The resultant solution is treated with charcoal and filtered and the solvent is evaporated from the filtrate. Addition of ether to the residue causes a precipitate to form. This is separated by filtration and dried to give a white powder which softens at about 110° C. before melting at about 115–130° C. with decomposition. The product thus obtained is 1-isopropyl-3-pyrrolidinylmethyl N-benzylcarbanilate methobromide and it has the following formula

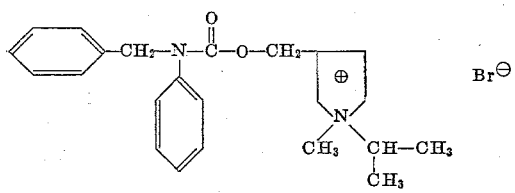

What is claimed is:
1. A compound of the formula

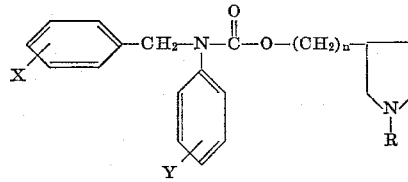

wherein X is selected from the group consisting of hydrogen, methyl, and halogen; Y is selected from the group consisting of hydrogen, methyl, and halogen; n is a whole number between 0 and 1 inclusive; and R is lower alkyl.

2. A compound of the formula

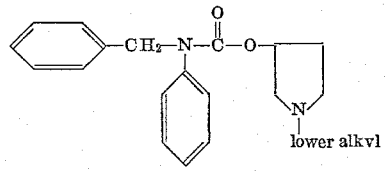

3. 1-methyl-3-pyrrolidinyl N-benzylcarbanilate.
4. 1-methyl-3-pyrrolidinyl N-benzylcarbanilate methobromide.
5. A compound of the formula

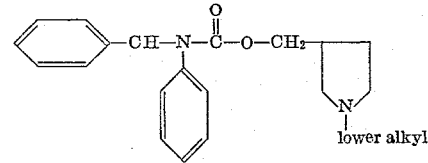

6. 1-methyl-3-pyrrolidinylmethyl N-benzylcarbanilate.

References Cited by the Examiner
UNITED STATES PATENTS
2,746,965  5/1956  Biel _____ 260—294.3

OTHER REFERENCES

Biel et al.: J. Am. Chem. Soc., vol. 77, pp. 2250–55 (1955).

ALEX MAZEL, *Primary Examiner.*

HENRY R. JILES, *Examiner.*

J. A. NARCAVAGE, *Assistant Examiner.*